US007611557B2

(12) United States Patent
Hoffman

(10) Patent No.: US 7,611,557 B2
(45) Date of Patent: Nov. 3, 2009

(54) REVERSED PRESSURE RELIEF VALVE

(75) Inventor: Karl K. Hoffman, Arlington Heights, IL (US)

(73) Assignee: Plitek, LLC, Des Plaines, IL (US)

( * ) Notice: Subject to any disclaimer, the term of this patent is extended or adjusted under 35 U.S.C. 154(b) by 840 days.

(21) Appl. No.: 11/088,678

(22) Filed: Mar. 24, 2005

(65) Prior Publication Data
US 2006/0227462 A1    Oct. 12, 2006

(51) Int. Cl.
*B01D 53/04* (2006.01)
*B01D 53/22* (2006.01)

(52) U.S. Cl. .......... 55/385.6; 55/385.4; 55/524; 96/135; 96/153; 96/154; 422/171; 422/177; 426/113; 426/116; 426/237; 219/735; 220/203.1; 220/245; 220/367.1; 220/745; 454/184; 454/192; 360/97.02

(58) Field of Classification Search ............ 55/385.6, 55/524, 385.4, 486, 487; 96/135, 153, 154; 422/171, 177; 426/113, 116, 237; 219/735; 220/203.1, 245, 367.1, 745; 454/184, 192; 360/97.02
See application file for complete search history.

(56) References Cited

U.S. PATENT DOCUMENTS

| 3,547,305 A | 12/1970 | Khoury |
| 4,134,535 A | 1/1979 | Barthels et al. |
| 4,653,661 A | 3/1987 | Buchner et al. |
| 5,263,777 A | 11/1993 | Domke |
| 5,417,743 A * | 5/1995 | Dauber .......... 96/13 |
| 5,584,409 A | 12/1996 | Chemberlen |
| 5,727,881 A | 3/1998 | Domke |
| 5,782,266 A | 7/1998 | Domke |
| 5,869,009 A * | 2/1999 | Bellefeuille et al. ......... 422/171 |
| 5,881,881 A | 3/1999 | Carrington |
| 5,989,608 A | 11/1999 | Mizuno |
| 5,997,614 A * | 12/1999 | Tuma et al. .......... 96/4 |
| 6,395,073 B1 * | 5/2002 | Dauber .......... 96/134 |
| 6,582,113 B2 * | 6/2003 | Rogers .......... 362/547 |
| 6,800,106 B2 * | 10/2004 | Cogar et al. .......... 55/385.6 |
| 6,926,761 B2 * | 8/2005 | Johnson et al. .......... 96/135 |
| 7,306,659 B2 * | 12/2007 | Gorton et al. .......... 96/134 |
| 7,344,578 B2 * | 3/2008 | Origlia .......... 55/385.4 |
| 7,396,391 B2 * | 7/2008 | Waida .......... 96/4 |

OTHER PUBLICATIONS

British Search Report, Jun. 13, 2005.

* cited by examiner

*Primary Examiner*—Robert A Hopkins
*Assistant Examiner*—Minh-Chau T Pham
(74) *Attorney, Agent, or Firm*—Niro, Scavone, Haller & Niro

(57) ABSTRACT

A reversed pressure relief valve that is used in connection with a computer hard disk drive so as to vent pressurized gases contained within the disk drive while not permitting debris to enter the drive mechanism or the valve. More specifically, the present invention is a reversed direction valve which includes at least one passageway defined by at least a lifter ring, a dry strap, a pressure sensitive adhesive ("PSA")/ body film and a filter media.

18 Claims, 1 Drawing Sheet

REVERSED PRESSURE RELIEF VALVE

BACKGROUND OF THE INVENTION

The present invention relates to a reversed pressure relief valve that is used in connection with a computer hard disk drive so as to vent pressurized gases contained within the disk drive while not permitting debris to enter the drive mechanism or the valve. More specifically, the present invention is a reversed direction valve which includes at least one passageway defined by at least a lifter ring, a dry strap, a pressure sensitive adhesive ("PSA")/body film and a filter media.

SUMMARY OF THE INVENTION

The invention pertains to a reversed valve that is used on packaging for and on computer hard disk drives. A typical pressure relief valve is enclosed within a chamber formed by walls and a filter membrane to vent products which produce an increased pressure within an enclosed space or chamber. To prevent excessive pressure from building within an enclosed chamber, a pressure relief valve is used to vent the gases causing a build-up of excessive pressure.

Valves are used in connection with computer hard disk drives in conjunction with a normally venting valve. There is a need in the computer hard disk drive industry to have a one-way valve that vents gases out of the drive that allows the gas to be pressurized inside the valve. This vent valve allows ambient atmosphere to normalize and any moisture to pass out of the drive. It also blocks any foreign matter from returning.

The current reversed valve invention operates to permit gases to flow in one direction while permitting the gases to be pressurized within the valve. Additionally, the reversed valve of the current invention operates in the opposite direction from a standard valve design while preventing debris from entering the pressurized chamber. Debris could negatively impact the operation of the disk drive mechanism.

The reversed valve for use with a disk drive is intended to operate such that normal (ambient) air pressure may be maintained within a chamber containing a hard disk drive while preventing debris from entering the disk drive chamber. The reversed valve is positioned over a hole in the disk drive chamber. The reversed valve permits air into the disk drive chamber. A filter media prevents debris from entering and contaminating the reversed valve assembly.

The present invention offers the advantage of having a relatively thin construction that is also extremely flexible. The present invention may operate under relatively low pressure since the valve closes mechanically once absolute pressure is obtained. The valve also maintains absolute pressure within the chamber without requiring any regulating mechanism.

DESCRIPTION OF THE DRAWINGS

These and other features, objects and advantages of the present invention will become apparent from the following description and drawings wherein like reference numerals represent like elements in several views, and in which.

DESCRIPTION OF THE PREFERRED EMBODIMENTS

Figure 1:
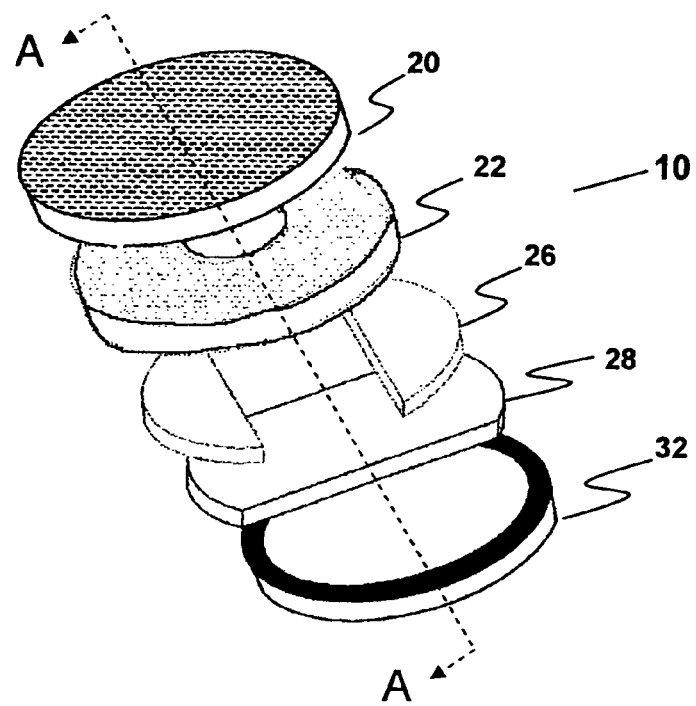
FIG. 1 is a perspective exploded view of the reversed valve of the invention.
Figure 2:
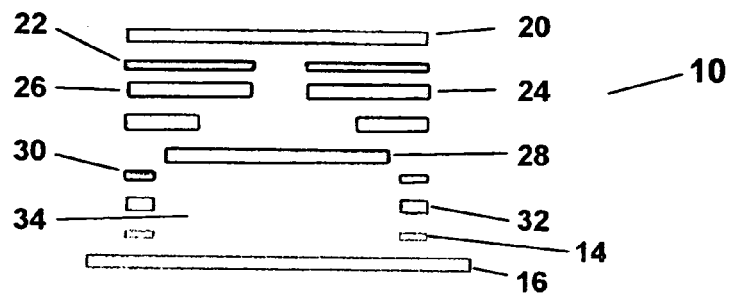
FIG. 2 is a cross-sectional view taken along line A-A.
Figure 3:
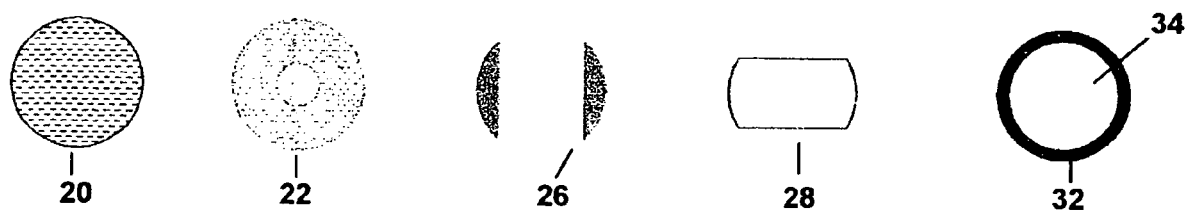
FIG. 3 is a view of the various layers of the valve.

The construction of the reversed valve 10 is apparent from the depiction of the valve 10 in FIGS. 1-3. The filter media 20 is positioned at the uppermost portion of the valve 10. The filter media 20 may be constructed of non-woven media with or without a charcoal medium, but preferably is made of spun bond polypropylene. Typically, the filter media 20 is configured in a circular pattern, however, it could be constructed of other shapes as well.

Positioned below the filter media 20 is a laminating adhesive 22. The laminating adhesive 22 does not cover the entire surface area of the filter media 20. The laminating adhesive 22 adheres the filter media 20 to a pressure sensitive adhesive/body film 24. The laminating adhesive 22 is preferably a pressure sensitive material that complies with the minimal outgassing physical properties for adhesives in the market for hard disk drive products which are typically manufactured by companies like Avery Dennison, 3M, etc.

The PSA/body film 24 functions to fuse all the material members. The PSA/body film 24 is made of clean no-outgassing acrylic pressure sensitive materials and is between 0.001" and 0.005" thick. The PSA/body film 24 has the same general shape and size as the media filter 20.

The present invention includes a dry strap 28 that is adhered to the PSA/body film 24 by means of a dry strap PSA 26. The dry strap 28 preferably has a rectangular shape but is not limited to any geometric shape. Other shapes may be utilized so long as the function of the degassing process is not encumbered. The dry strap PSA 26 is adhered to the two ends of the dry strap 28. The dry strap PSA 26 should not cover the entire surface area of the dry strap 28.

The next layer of the reversed valve 10 is the lifter ring 32. The lifter ring 32 is made of a polyolefin type material. The lifter ring 32 is generally ring shaped and generally conforms to the outer circumference of the filter media 20. The internal circumference of the lifter ring 32 generally conforms to the circumference of the chamber 34 in the chamber wall 18. The chamber 34 permits gases to flow from the chamber into the reversed valve 10. The lifter ring 32 is adhered to the dry strap 28 by means of a lifter ring adhesive 30. The lifter ring adhesive 30 is preferably made of polyolefin and has the same general shape as the lifter ring 32. The lifter ring 32 is also adhered to the release paper 16 and eventually to the chamber wall (not shown) by means of a laminating adhesive 14. The laminating adhesive 14 is made of a pressure sensitive adhesive affixed for hard disk drive use.

The lifter ring 32 serves to support the dry strap 28 and the filter media 20. In operation, the reversed valve 10 is removed from the release paper 16. The reversed valve 10 is then adhered to a chamber wall (not shown) such that the circular configuration of the lifter ring 32 generally aligns with a chamber 34 in the chamber wall. The chamber formed by the chamber wall contains a computer hard disk drive (not shown). The reversed valve 10 is placed outside of the chamber wall and positioned over a small chamber 34. The air flow of the valve is such that atmosphere will only flow into the chamber 34. A filter media 20 prevents any debris from entering the reversed valve 10.

While the invention has been described with reference to the preferred embodiments thereof, it will be appreciated that numerous variations, modifications, and alternate embodiments are possible, and accordingly, all such variations, modifications, and alternate embodiments are to be regarded as being within the spirit and scope of the invention.

It should be understood that various changes and modifications to the preferred embodiments described would be apparent to those skilled in the art. Changes and modifications can be made without departing from the spirit and scope of the present invention and without diminishing its intended advantages. It is, therefore, intended that such changes and modifications be covered by the following claims.

What is claimed is:

1. A reversed valve for computer hard disk drives comprising:
   a filter media layer;
   a PSA/body film located below said filter media layer,
   a laminating adhesive partially attaching the filter media to the PSA/body film;
   a dry strap located below said PSA/body film;
   dry strap PSA adhesive adhered to the outer ends of the dry strap that attaches a portion of the dry strap to the PSA/body film;
   a lifter ring located below said dry strap having a ring-shaped configuration that permits gas to penetrate through the center of the ring;
   lifter ring adhesive on a top surface of said lifter ring that attaches a portion of the lifter ring to the dry strap;
   a laminating adhesive on a bottom surface of said lifter ring that attaches said reversed valve to a surface.

2. The reversed valve of claim 1, wherein the filter media comprises spun bond polypropylene or equivalent.

3. The reversed valve of claim 2, wherein the filter media is circular shaped.

4. The reversed valve of claim 3, wherein the filter media filters particles down to 0.1 micron in size.

5. The reversed valve of claim 1, wherein the dry strap is configured to permit gases to pass through the lifter ring to the PSA/body film.

6. The reversed valve of claim 5, wherein the dry strap is oblong shaped.

7. The reversed valve of claim 5, wherein the dry strap creates a one-way flow of gas.

8. The reversed valve of claim 1, wherein the lifter ring forms a chamber that permits the dry strap and PSA/body film to close mechanically when absolute pressure is obtained in the chamber.

9. The reversed valve of claim 1, in which the lifter ring is made of a polyolefin type material.

10. The reversed valve of claim 1 wherein the PSA/body film is a pressure sensitive material between around 0.001 inch and 0.005 inch thick.

11. A reversed valve for computer hard disk drives comprising:
    a filter media layer;
    a PSA/body film positioned below said filter media layer, said PSA/body film being acrylic pressure sensitive material of thickness between around 0.001 to 0.005 inches;
    a dry strap layer positioned below the filter PSA/body film;
    a lifter ring layer positioned below the dry strap wherein the lifter ring has an exterior wall and an interior wall;
    wherein the interior wall of the lifter ring and the dry strap form a chamber that permits gases to flow through the chamber when the pressure is greater than ambient; and prohibits air flow when the pressure is less than or equal to ambient;
    an adhesive binding the filter media layer, the dry strap and lifter ring together.

12. The reversed valve of claim 11. wherein a first adhesive layer is positioned between the filter media and the PSA/body film and a second adhesive layer is positioned between the dry strap and the lifter ring.

13. The reversed valve of claim 11, wherein the filter media is circular shaped.

14. The reversed valve of claim 11, wherein the filter media filters particles down to 0.1 micron in size.

15. The reversed valve of claim 11, wherein the dry strap is configured to permit gases to pass through the lifter ring to the PSA/body film.

16. The reversed valve of claim 11, wherein the dry strap is oblong shaped.

17. The reversed valve of claim 11, wherein the dry strap creates a one-way flow of gas.

18. The reversed valve of claim 11, in which the lifter ring is made of a polyolefin type material.

* * * * *